(12) United States Patent
Hasegawa et al.

(10) Patent No.: US 6,581,007 B2
(45) Date of Patent: Jun. 17, 2003

(54) SYSTEM, METHOD, AND PROGRAM FOR DETECTING APPROACH TO OBJECT

(75) Inventors: Yuji Hasegawa, Fujimi (JP); Jiro Okuma, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/140,951

(22) Filed: May 9, 2002

(65) Prior Publication Data

US 2002/0169555 A1 Nov. 14, 2002

(30) Foreign Application Priority Data

May 11, 2001 (JP) ........................................ 2001-141976
Apr. 2, 2002 (JP) ........................................ 2002-100567

(51) Int. Cl.[7] ............................................. G06F 17/10
(52) U.S. Cl. ......................... 701/301; 701/28; 340/436; 340/903
(58) Field of Search ........................ 701/28, 117, 301; 340/436, 903

(56) References Cited

U.S. PATENT DOCUMENTS 5,128,874 A    7/1992  Bhanu et al.
6,175,652 B1 *  1/2001  Jacobson et al. ........... 382/216
6,246,961 B1    6/2001  Sasaki et al.

FOREIGN PATENT DOCUMENTS

JP    6-247246    9/1994
JP   11-134504    5/1999
JP    3011566    12/1999
JP   11-353565   12/1999

OTHER PUBLICATIONS

"A Theory of Visual Control of Braking Based on Information About Time–To–Collision", Perception, 1976, vol. 5, pp. 437–459, David N. Lee.

* cited by examiner

Primary Examiner—Gertrude Arthur
(74) Attorney, Agent, or Firm—Birch, Stewart, Kolasch & Birch, LLP

(57) ABSTRACT

A system for accurately detecting approach to an object by performing simple processing. The system comprises an optical flow calculating section for calculating an optical flow based on at least two time-series images; a first adding section for calculating an added value for detecting approach, by adding values corresponding to data of the optical flow assigned to a first predetermined area defined on the images, where a predetermined filter function is used in the adding calculation; a second adding section for calculating an added value for detecting vibration, by adding values corresponding to data of the optical flow assigned to a second predetermined area defined on the images, where said filter function is used in the adding calculation; and, a situation determining section for determining that approach to the object has occurred when a difference between the added values for detecting approach and vibration exceeds a predetermined threshold value.

15 Claims, 4 Drawing Sheets

SYSTEM, METHOD, AND PROGRAM FOR DETECTING APPROACH TO OBJECT

BACKGROUND OF THE INVENTION

1. Field of the Invention

The present invention relates to a system, method, and program for detecting approach to an object based on an optical flow calculated by image processing.

2. Description of the Related Art

In order to avoid a collision of a movable agent against an object, a method using an algorithm is known (refer to David N Lee, "A Theory of Visual Control of Braking Based on Information about Time-to-Collision", Perception, Vol. 5, pp. 437–459, 1976). In this algorithm, a time from the current time to an estimated collision with the object is calculated based on optical flow data. Typically, a camera is attached to the movable agent and image processing is performed using this algorithm based on images taken by the camera, thereby calculating the time at which the movable agent will just reach the object. That is, the algorithm can be effectively used for detecting approach of a movable agent to an object.

However, this conventional method does not consider the pitch and roll of the movable agent itself during the approach of the movable agent; thus, it may be difficult to detect an accurate degree of the approach. Here, when the movable agent moves, the motion includes swinging or vibration. Therefore, each optical flow calculated based on the images in the actual situation, which are taken by a camera attached to the movable agent, has an approach component (i.e., a component in the direction in which the movable agent approaches to the object) which includes a vibration component in the yaw (i.e., horizontal) direction, the pitch (i.e., vertical) direction, or the like. In the detection of approach to an obstacle based on the optical flow data, these vibration components function as noise components which cause erroneous detection. The applicant of the present invention proposed a method for detecting approach to an obstacle in Japanese Unexamined Patent Application, First Publication No. Hei 11-134504; however, a detection or recognition method having a higher accuracy has been required.

SUMMARY OF THE INVENTION

In consideration of the above circumstances, an object of the present invention is to provide a system, method, and program for accurately detecting approach to an object by performing simple processing even if processed images include a vertical or horizontal vibration component.

Therefore, the present invention provides a system for detecting approach to an object based on time-series images of a surrounding environment, comprising:

an optical flow calculating section for calculating an optical flow based on at least two time-series images;

a first adding section for calculating an added value for detecting approach, by adding values corresponding to data of the optical flow assigned to a first predetermined area defined on the images, where a predetermined filter function is used in the adding calculation;

a second adding section for calculating an added value for detecting vibration, by adding values corresponding to data of the optical flow assigned to a second predetermined area defined on the images, where said filter function is used in the adding calculation; and, a situation determining section for determining that approach to the object has occurred when a difference between the added values for detecting approach and vibration exceeds a predetermined threshold value.

According to this structure, even when the image data include a vibration component in a vertical or horizontal direction, the approach to the object can be detected with high accuracy by simply calculating a difference between the added values (each assigned to a specific predetermined area) for detecting approach and vibration of the optical flow.

As a typical example, the second predetermined area is defined in a manner such that the second predetermined area does not include a source of the optical flow on the images; and the first predetermined area is defined further from the source of the optical flow in comparison with the second predetermined area. In this case, when the approach to the object proceeds, the difference between the added value related to a component for detecting approach and the added value related to a yaw or pitch component, which acts as a noise component, can be large, thereby improving the detecting accuracy and easily determining and detecting a collision.

The vibration component included in the image has large noise components in the yaw and pitch directions. In order to efficiently remove the noise components, the first and second predetermined areas may be defined so as to calculate the added values for detecting approach and vibration by using at least one of a yaw component and a pitch component of the optical flow.

The situation determining section may include:

a noise removing section for removing a high-frequency noise component from each of the added values for detecting approach and vibration by using a temporal filter based on a predetermined time constant;

a weighting section for multiplying each of the added values for detecting approach and vibration, which include no high-frequency noise component, by a predetermined weight coefficient;

a subtracting section for calculating a difference between the weighted added value for detecting approach and the weighted added value for detecting vibration; and a determining section for determining whether the difference between the weighted added values for detecting approach and vibration exceeds a predetermined threshold value.

According to the above structure, which has the section for removing a high-frequency noise component from each of the two added values, and the section for weighting the two added values, the added values can be suitably corrected according to the moving speed of a movable agent, and the angle of visibility, the resolution, and the sampling frequency of the image, thereby improving the detecting accuracy.

The present invention also provides a method of detecting approach to an object based on time-series images of a surrounding environment, comprising:

an optical flow calculating step for calculating an optical flow based on at least two time-series images;

a first adding step for calculating an added value for detecting approach, by adding values corresponding to data of the optical flow assigned to a first predetermined area defined on the images, where a predetermined filter function is used in the adding calculation;

a second adding step for calculating an added value for detecting vibration, by adding values corresponding to data of the optical flow assigned to a second predetermined area defined on the images, where said filter function is used in the adding calculation; and, a situation determining step for determining that approach to the object has occurred when a difference between the added values for detecting approach and vibration exceeds a predetermined threshold value.

According to this method, even when the image data include a vibration component in a vertical or horizontal direction, the approach to the object can be detected with high accuracy by simply calculating a difference between the added values (each assigned to a specific predetermined area) for detecting approach and vibration of the optical flow.

The situation determining step may include:
- a noise removing step for removing a high-frequency noise component from each of the added values for detecting approach and vibration by using a temporal filter based on a predetermined time constant;
- a weighting step for multiplying each of the added values for detecting approach and vibration, which include no high-frequency noise component, by a predetermined weight coefficient;
- a subtracting step for calculating a difference between the weighted added value for detecting approach and the weighted added value for detecting vibration; and
- a determining step for determining whether the difference between the weighted added values for detecting approach and vibration exceeds a predetermined threshold value.

According to the above method, which has the step of removing a high-frequency noise component from each of the two added values, and the step of weighting the two added values, the added values can be suitably corrected according to the moving speed of a movable agent, and the angle of visibility, the resolution, and the sampling frequency of the image, thereby improving the detecting accuracy.

The present invention also provide a program for making a computer execute an operation for detecting approach to an object based on time-series images of a surrounding environment, the operation comprising:
- an optical flow calculating step for calculating an optical flow based on at least two time-series images;
- a first adding step for calculating an added value for detecting approach, by adding values corresponding to data of the optical flow assigned to a first predetermined area defined on the images, where a predetermined filter function is used in the adding calculation;
- a second adding step for calculating an added value for detecting vibration, by adding values corresponding to data of the optical flow assigned to a second predetermined area defined on the images, where said filter function is used in the adding calculation; and,
- a situation determining step for determining that approach to the object has occurred when a difference between the added values for detecting approach and vibration exceeds a predetermined threshold value.

DESCRIPTION OF THE PREFERRED EMBODIMENTS

Hereinafter, an approach detecting system as an embodiment of the present invention will be explained in detail with reference to the drawings.

Figure 1:
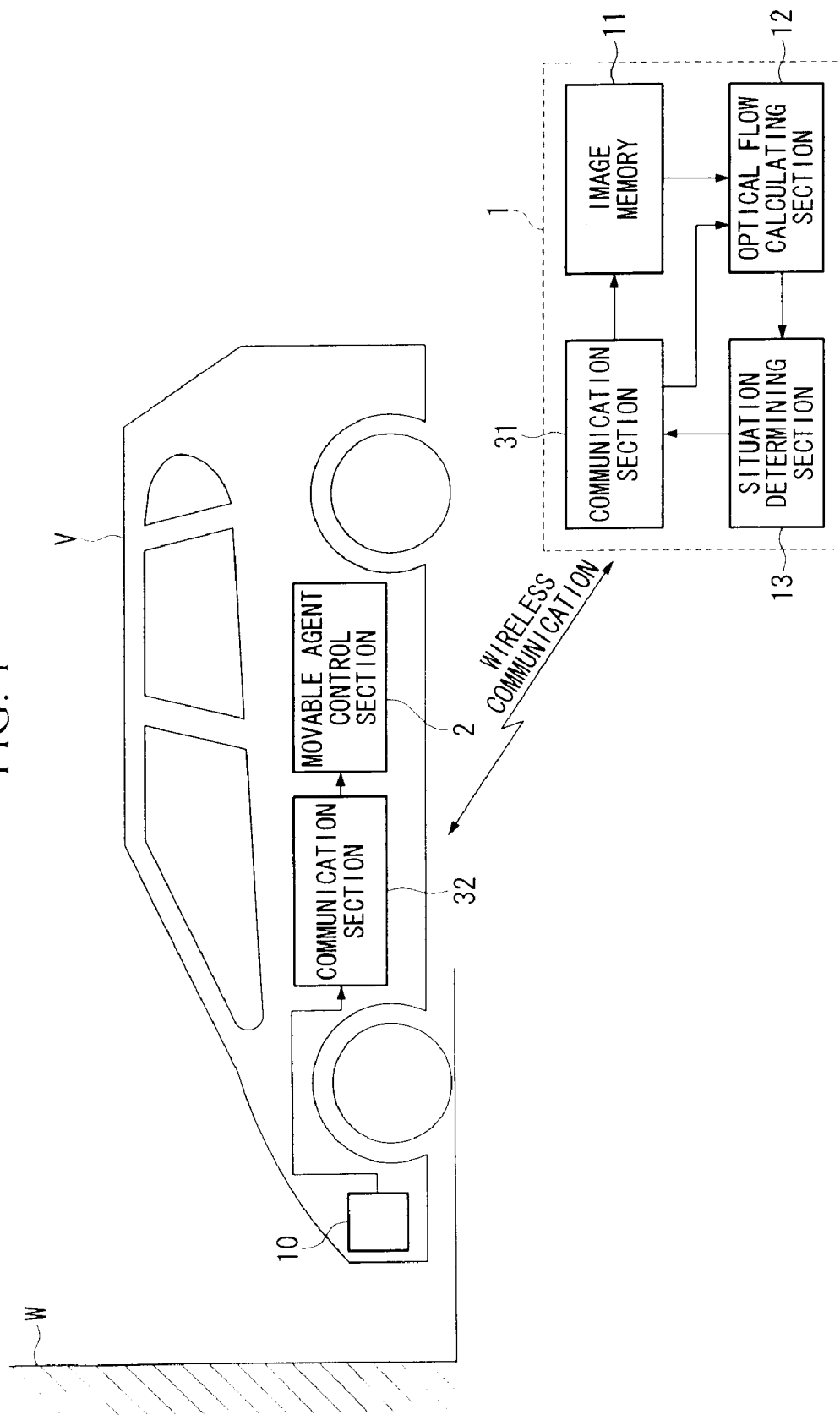
FIG. 1 is a block diagram showing the structure of an embodiment according to the present invention.

FIG. 1 is a block diagram showing the structure of the system. In the figure, reference numeral 1 indicates the approach detecting system. Reference numeral 11 indicates an image memory for storing obtained images, which can store at least two images. Reference numeral 12 indicates an optical flow calculating section for calculating an optical flow based on two images stored in the image memory 11. Reference numeral 13 indicates a situation determining section for determining an approach situation between the system and an object based on the optical flow calculated by the optical flow calculating section 12. Reference numeral 31 indicates a communication section for performing wireless data communication.

Reference symbol V indicates a movable agent. In the following explanation, the movable agent V is a motorcar and is thus called "motorcar V". Reference symbol W indicates a wall which is an object to which the movable agent approaches, and the wall is called the "object W" in the following explanation.

Reference numeral 10 indicates a video camera (simply called the "camera", hereinbelow), built into the motorcar V, for taking and obtaining time-series images of the surrounding environment. This camera 10 is positioned so as to cover a view in front of the motorcar V in a manner such that the optical axis of the camera 10 is arranged in the horizontal direction when the motorcar V is positioned on horizontal ground.

Reference numeral 2 indicates a movable agent control section, provided in the motorcar V, for performing a motion control of the motorcar V based on an output from the situation determining section 13. Reference numeral 32 indicates a communication section, provided in the motorcar V, for communicating with the communication section 31 of the approach detecting system 1.

The approach detecting system 1 must be positioned where the communication sections 31 and 32 can communicate with each other. Therefore, in principle, the position of the approach detecting system 1 is determined based on a distance for enabling communication and an action range of the movable agent (i.e., an area where the movable agent can be present). Such an action range can be extended by connecting the communication sections 31 and 32 via a public communication line such as a cellular phone network. In addition, the approach detecting system 1 may be built into the motorcar V (i.e., in the movable agent).

Figure 2:
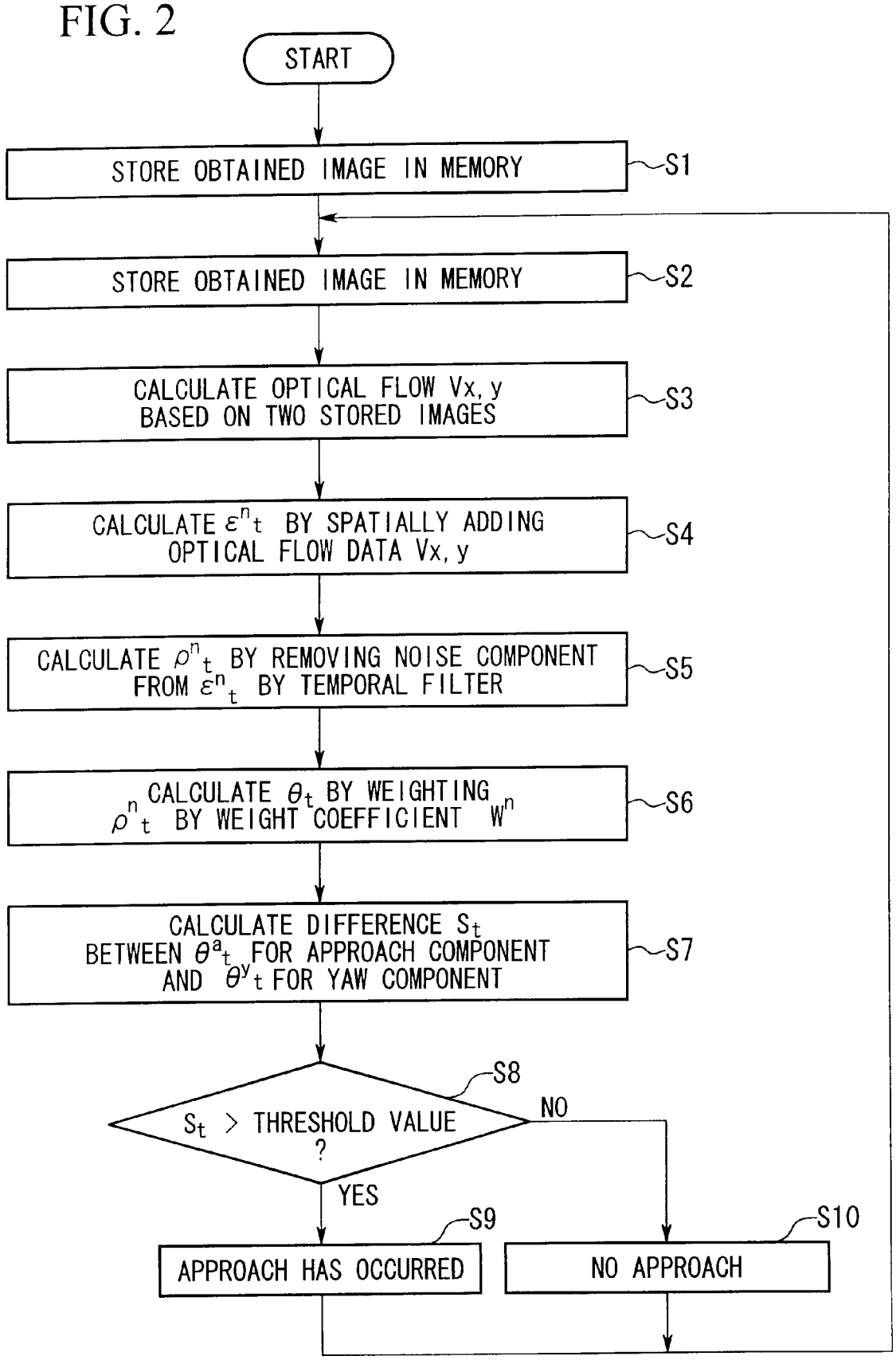
FIG. 2 is a flowchart showing the operation of the approach detecting system 1 in FIG. 1.

Below, the operation of the approach detecting system 1 will be explained with reference to FIGS. 1 and 2. FIG. 2 is a flowchart showing this operation.

When the operation of the approach detecting system 1 is started, the communication section 31 is set to be communicable, and the image memory 11, the optical flow calculating section 12, and the situation determining section 13 are activated. On the other hand, when the ignition switch of the motorcar V is switched on, the communication section 32 is set to be communicable, and image taking using the camera 10 is started, and the movable agent control section 2 is also activated. Accordingly, an image (signal) obtained by the camera 10 is stored via the communication sections 32 and 31 into the image memory 11. This image obtained by the camera 10 is subjected to sampling and quantization, so that a digital image having m×n pixels (m and n are natural numbers) is obtained and stored in the image memory 11 (see step S1).

In the next step S2, the following image taken by the camera 10 (i.e., the second obtained image from the system start) is stored in the image memory 11. This is because at least two images are necessary for calculating an optical flow. At this stage, two time-series images are stored in the image memory 11. In the following explanation, the newest image is defined as an image taken at time t (or an image of time t), and the previous image taken immediately before the image of time t is called an image taken at time t−1 (or an image of time t−1).

When the storage of each image in the image memory 11 is finished, the optical flow calculating section 12 is informed via the communication sections 32 and 31 of the completion of the storage of the image. When receiving this information, the optical flow calculating section 12 calculates an optical flow Vx,y based on the latest two images stored in the image memory 11 (see step S3).

Specifically, the optical flow is a velocity field defined for each pixel and thus indicates where a pattern which was present at a position on an image moves on the next image, where the movement of each pixel can be indicated. That is, between the time-series images, the temporal movement of each pixel is indicated using a vector. According to the optical flow, the (past) motion of a target object in the images can be estimated.

The optical flow can be calculated by using a known method such as search for corresponding points between two images, estimation based on the brightness gradient of each point and the temporal gradient of brightness, or the like. According to the above process, optical flow data can be obtained for each point whose positions on the two images can correspond to each other. The optical flow calculating section 12 then transfers the calculated optical flow Vx,y to the situation determining section 13.

The situation determining section 13, which receives the optical flow Vx,y, calculates value $\epsilon^n_t$ by using the following formula (1), that is, value $\epsilon^n$ is obtained by spatially adding optical flow data defined in a predetermined image area (called the "selected area", hereinbelow) (see step S4).

$$\epsilon^n_t = \Sigma\Sigma h^n x\, y\, V_{x,y} \quad (1)$$

Here, $h^n x,y$ is a function which indicates characteristics of each selected area (for example, the area and the center position of the selected area), which are used for spatially adding the optical flow data. This function is a spatially localized filter function such as a Gauss function or a Gabor function. According to the formula (1), the optical flow data (i.e., vectors) in a specific selected area on the images, which is defined by the function $h^n x,y$, are added. More specifically, the characteristics of the selected area (i.e., the function $h^n x,y$) are determined by (i) the speed of the motorcar V into which the camera 10 is built (see FIG. 1), (ii) the angle of visibility, the resolution, and the sampling frequency of the camera 10, and the like. The characteristics of the selected area (i.e., $h^n x,y$) may be determined according to how early a trigger should be output before an estimated collision against the object W, that is, how many seconds are required before the collision. However, the following conditions must always be satisfied.

(i) A pair of selected areas for detecting an approach component must be symmetrically defined at the right and left sides with respect to a source of an optical flow (in the image) produced when the motorcar V moves ahead. In the present embodiment, it is assumed that the motorcar V moves straight ahead, and each of two pairs of corresponding selected areas is symmetrically defined at the right and left sides and the upper and lower sides inside the frame of each image.

(ii) A pair of selected areas for detecting a yaw component must be defined at the right and left sides on the horizontal line of the image.

(iii) A pair of selected areas for detecting a pitch component must be defined at the upper and lower sides on the vertical line of the image.

Figure 3:
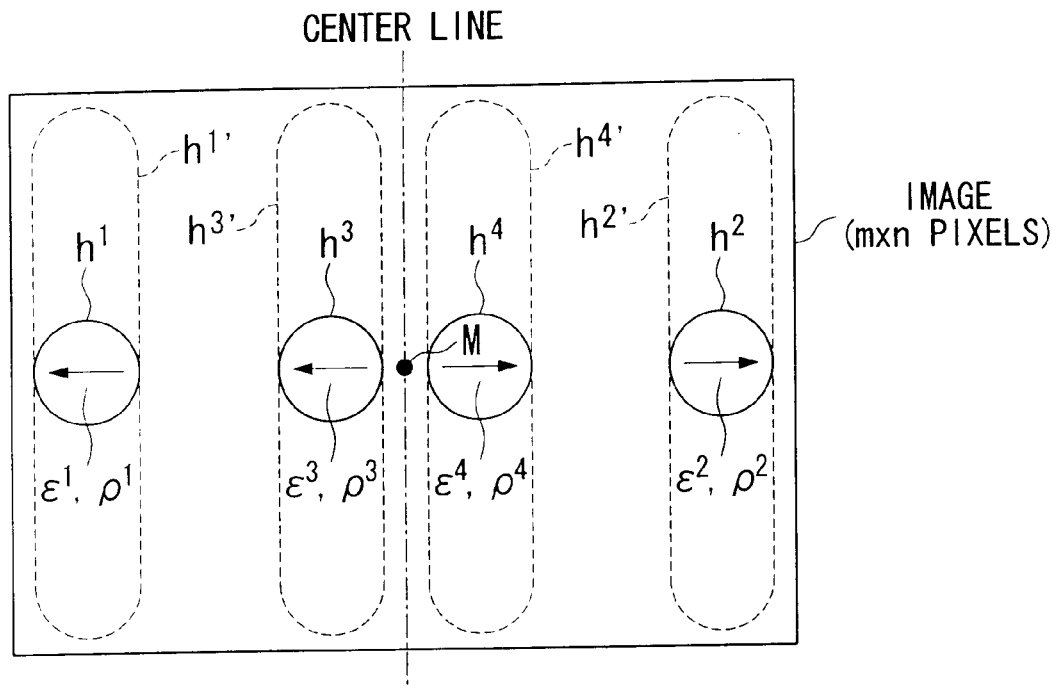
FIG. 3 shows an arrangement example of the selected areas for detecting approach by using a yaw component.
Figure 4:
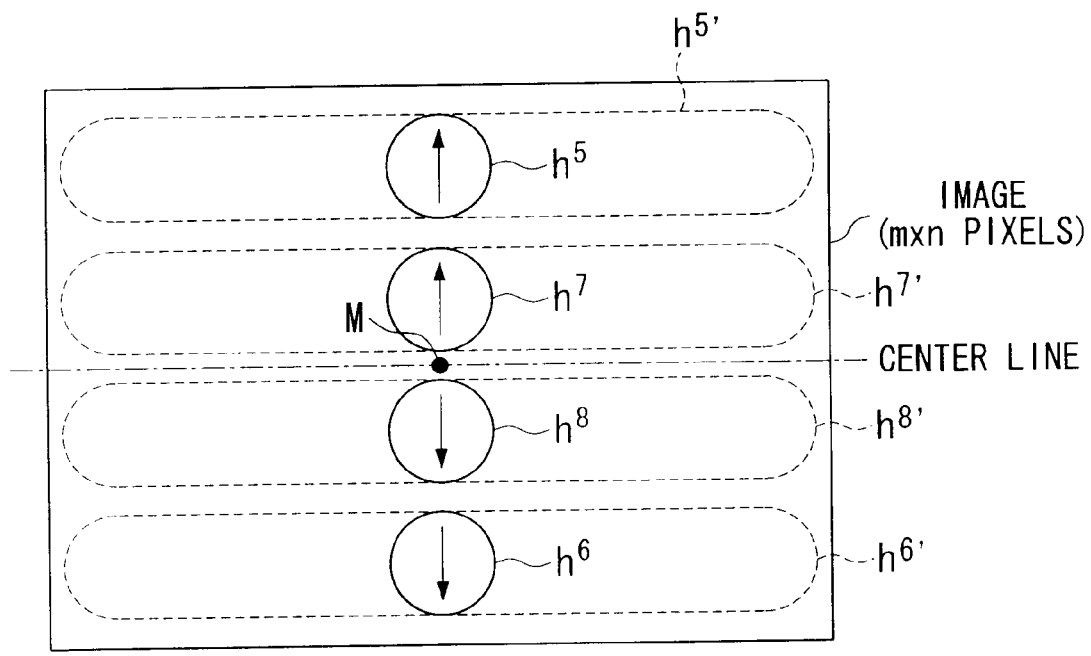
FIG. 4 shows an arrangement example of the selected areas for detecting approach by using a pitch component.

In addition, the superscript "n" indicates a serial number assigned to each selected area. As shown in FIGS. 3 and 4 (explained below), in the present embodiment, the number of the serial numbers (n) is 8 (i.e., n=1 to 8). The number of serial numbers n is suitably determined according to the actual condition of vibration or swinging of the motorcar V, required accuracy for the approach detection, and so on.

Below, the positional relationship between the selected areas will be explained with reference to FIGS. 3 and 4.

FIG. 3 shows an arrangement example of the selected areas for detecting approach by using a yaw component of the optical flow Vx,y and removing noise components included in the yaw direction. In FIG. 3, reference symbols $h^1$ and $h^2$ indicate a pair of selected areas for detecting an approach component of the optical flow Vx,y. Reference symbols $h^3$ and $h^4$ indicate a pair of selected areas for detecting a yaw component of the optical flow Vx,y, which are positioned inside of the pair of the selected areas $h^1$ and $h^2$. That is, in this example, the selected areas of each pair for detecting the approach or yaw component are positioned at either side of the center line for dividing the image into the right and left halves. The selected areas $h^1$ to $h^4$ may be extended only in the pitch direction (i.e., vertical direction on the image) so that extended selected areas $h^{1\prime}$ to $h^{4\prime}$ are defined.

FIG. 4 shows an arrangement example of the selected areas for detecting approach by using a pitch component of the optical flow Vx,y and removing noise components included in the pitch direction. In FIG. 4, reference symbols $h^5$ and $h^6$ indicate a pair of selected areas for detecting an approach component of the optical flow Vx,y. Reference symbols $h^7$ and $h^8$ indicate a pair of selected areas for detecting a pitch component of the optical flow Vx,y, which are positioned inside of the pair of the selected areas $h^5$ and $h^6$. That is, in this example, the selected areas of each pair for detecting the approach or pitch component are positioned at either side of the center line for dividing the image into the upper and lower halves. The selected areas $h^5$ to $h^8$ may be extended only in the yaw direction (i.e., horizontal direction in the image) so that extended selected areas $h^{5\prime}$ to $h^{8\prime}$ are defined.

Generally, in a situation as shown in FIG. 1, that is, when the motorcar V moves forward and approaches the object W, the optical flow calculated by the obtained images has radial vectors dispersed from a point M (i.e., a focus of expansion corresponding to a source of the optical flow). In this case, the sizes of the vectors in the flow in each selected area generally have the relationships $h^1 > h^3$ and $h^2 > h^4$.

If a vibration in the yaw direction according to the movement of the motorcar V is imposed on the camera 10, the vector size of the yaw component corresponding to this vibration has no considerable difference in each selected area. However, in the selected areas $h^1$ and $h^2$, the sizes of the vectors produced by the approach of the motorcar V are relatively larger than those of the vectors produced by the vibration. Therefore, the approach component is detected using the selected areas $h^1$ and $h^2$ while the yaw component related to the vibration is detected using the selected areas $h^3$ and $h^4$ which receive relatively small influence of the approach. Accordingly, noise components can be efficiently removed. Similar explanations can be applied to the selected areas $h^5$ to $h^8$ used for detection in the pitch direction.

In the following step S5, the situation determining section 13 calculates a value $\rho''_t$ by using the following formula (2), where $\rho''_t$ indicates a value obtained by removing a high-frequency noise component from $\epsilon''_t$ (which is obtained in step S4 by spatially adding the optical flow data) by using a temporal filter.

$$\rho''_t = \rho''_{t-1} - \tau(\rho''_{t-1} - \epsilon''_t) \quad (2)$$

where $\Sigma(<1)$ is a time constant which is determined according to the speed of the motorcar V, or the like.

The situation determining section 13 then calculates a value $\theta_t$ by multiplying $\rho_t$ (an output from the noise-removing filter) by a weight coefficient $w^n$ and adding the products. Here, this $\theta_t$ is calculated for each of the detection of the approach component and the yaw component by using the following formulas (3) and (4) (see step S6).

That is, formula (3) is used for the detection of the approach component:

$$\theta^a_t = w^1 \rho^1_t + (-1 \cdot w^2) \rho^2_t \quad (3); \text{ and}$$

formula (4) is used for the detection of the yaw component:

$$\theta^y_t = w^3 \rho^3_t + (-1 \cdot w^4) \rho^4_t \quad (4).$$

In the above formulas, the reason for inverting the polarity by multiplexing the weight coefficient $w^n$ by "−1" is that the polarities of $\rho''_t$ calculated for the pair of selected areas $h^1$ and $h^2$ (or $h^3$ and $h^4$) are reversed to each other in principle, where these selected areas are symmetrically positioned at either side of the point M on the image; therefore, the polarity of one of the values $\rho''_t$ should be reversed.

In the next step S7, the situation determining section 13 calculates a difference $S_t$ between the first value $\theta^a_t$ for detecting the approach component and the second value $\theta^y_t$ for detecting the yaw component. In the following step S8, this value $S_t$ is compared with a predetermined threshold value. If the value $S_t$ is larger than the threshold value, the situation determining section 13 determines that the motorcar V has approached to the object W (see step S9), while if the value $S_t$ is equal to or smaller than the threshold value, the situation determining section 13 determines that no approach has been detected (see step S10). This result of determination is communicated to the movable agent control section 2 and is used as a trigger for controlling the deceleration or stopping of the motorcar V. As for the above threshold value, an optimum value is selected based on the speed of the motorcar V, the angle of visibility and the resolution of the camera 10, the characteristics of each selected area $h^n$x,y, and the like. The threshold value may be determined according to how early the trigger should be output before an estimated collision against the object W (that is, the number of seconds required before the collision). Following to the determination of the threshold value, the above-explained weight coefficient $w^n$ is also determined according to the speed of the motorcar V, the angle of visibility of the camera 10, and the like, so that the trigger can be output to the motorcar V at optimum timing.

After the determination in step S8 is completed, the operation returns to step S2, so that the above-explained steps S2 to S10 are repeated. In each repetition, only an image is newly obtained, that is, step S1 is not executed, and the image which was obtained in step S2 in the previous execution of the steps is used as the image of time t−1, and the newly-obtained image in the current execution of the steps is used as the image of time t.

As explained above, an image area used for detecting an approach component and an image area used for detecting the yaw or pitch component are determined as a pair of selected areas which are defined at either side of a center line for dividing the image into right and left or upper and lower halves. Based on the optical flow data in each selected area, simple computing operations are performed, and the approach to the object is determined based on whether the computed value is larger than a predetermined threshold value. Therefore, even for images including a vibration component, the approach situation can be accurately and rapidly detected. That is, the approach component is detected using the selected areas $h^1$ and $h^2$ where the approach to the object increases the sum of the optical flow data Vx,y, while the yaw component is detected using the selected areas $h^3$ and $h^4$ which are relatively less affected by the approach of the motorcar V. Therefore, noise components can be efficiently removed. As for the detection in the pitch direction, similar explanations can be applied.

The situation determining section 13 may simultaneously process a group of the selected areas $h^1$ to $h^4$ as shown in FIG. 3 and another group of the selected areas $h^5$ to $h^8$ as shown in FIG. 4, and a trigger for stopping the motorcar V may be output (i) when the value St calculated for any one of the groups exceeds a predetermined threshold value, or (ii) when both values $S_t$, calculated for both groups, respectively exceed predetermined threshold values.

Figure 5:
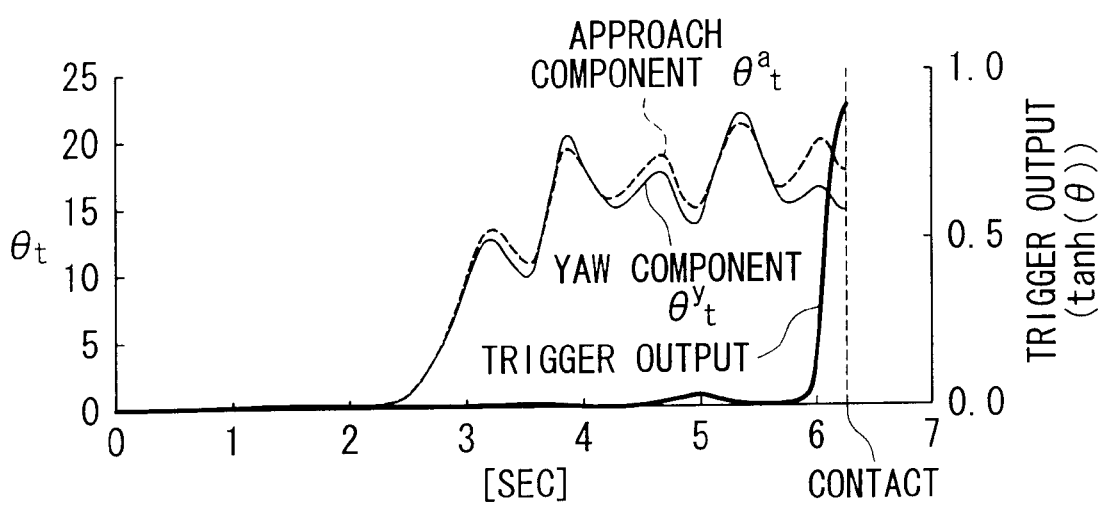
FIG. 5 is a graph showing the results of the operation as shown in FIG. 2.

Below, an experimental example for executing the operation using real images will be explained with reference to FIG. 5. FIG. 5 is a graph showing the results obtained by sampling a video image at a video rate, where the video image is taken by the camera 10 (built into the motorcar V) until the motorcar V contacts an obstacle.

In FIG. 5, the X (i.e., horizontal) axis shows the elapsed time from the starting of the motorcar V. In the Y (i.e., vertical) axes, the left axis shows values $\theta_t$ (i.e., two lines calculated by formulas (3) and (4)), while the right axis shows a trigger output which is calculated based on the difference between the two values $\theta_t$ (i.e., $\theta^a_t$ and $\theta^y_t$).

This difference between the two values $\theta_t$ is very small and is thus non-linearly amplified using a function tan h(θ) so as to clearly show the trigger output. Instead of using the function tan h for amplification, any function by which a considerable difference between two values can be detected may be used. In this experimental example, the motorcar V contacted the object W approximately 6.2 seconds after the starting of the motorcar V.

As is clearly understood from FIG. 5, two calculated values $\theta_t$ for the approach and yaw components have similar variations before the contact; however, the difference between the two values gradually increases as the motorcar V approaches the object, and in particular, the difference becomes considerably large 5.8 seconds after the starting of the motorcar V, so that the trigger is output. Therefore, the approach detecting system of the present embodiment outputs the trigger when the above difference $S_t$ exceeds a predetermined threshold value, so as to detect approach of the movable agent to an object. According to the trigger output, the motorcar V may be decelerated or stopped, thereby avoiding a collision against the wall W.

In the examples shown in FIGS. 3 and 4, two selected areas are defined in each of the right and left halves, or the upper and lower halves in the image. However, two selected areas may be defined only in one of the right and left halves, or the upper and lower halves if a high detection accuracy is unnecessary. That is, in the example of FIG. 3, only the selected areas $h^1$ and $h^3$ (or $h^2$ and $h^4$) may be processed. In this case, the formulas (3) and (4) are simplified as follows:

$$\theta^a_t = w^1 \rho^1_t \quad (3)'$$

$$\theta^v_t = w^3 \rho^3_t \quad (4)'$$

Similarly, in the example of FIG. 4, only the selected areas $h^1$ and $h^7$ (or $h^6$ and $h^8$) may be processed.

On the other hand, three or more selected areas may be defined in each of the right and left halves, or the upper and lower halves in the image.

In the above explanation, the approach is detected using yaw components; however, the approach can also be detected using pitch components by executing a similar operation. The movable agent is not limited to a motorcar, but may be a self-controlled robot such as a bipedal humanoid robot, or an automatic guided vehicle.

In addition, an additional camera which has an optical axis perpendicular to the optical axis of the camera 10 may be provided, and based on an optical flow for images taken by this additional camera, a roll component of the motorcar V may be calculated and communicated to the situation determining section 13, so as to remove effects of the roll component. A gyroscope may be used for detecting a roll component, and the detected roll component may be communicated to the situation determining section 13, thereby removing the effects by the roll component.

A program for executing the operation shown in FIG. 2 may be stored in a computer readable storage medium, and this stored program may be loaded and executed on a computer system, so as to perform the approach detection. The computer system includes hardware resources such as an operating system and peripheral devices. When using a World Wide Web system, the computer system includes a homepage providing (or displaying) environment. In addition, the computer readable storage medium may be a portable medium such as a flexible disk, magneto-optical disk, ROM, CD-ROM, or the like, or a storage medium built in the computer system, such as a hard disk. The computer readable storage medium may also be a device for temporarily storing the program, such as a volatile memory (i.e., RAM) in the computer system which functions as a server or client for receiving the program sent via a network (e.g., the Internet) or a communication line (e.g., a telephone line).

The above program may be transmitted from the computer system (which stores the program in a storage device or the like) via a transmission medium (on transmissive waves through the transmission medium) to another computer system. The transmission medium through which the program is transmitted is a network such as the Internet or a communication line such as a telephone line, that is, a medium which has a function for transmitting data.

In addition, a program for performing a portion of the above-explained functions may be used. Furthermore, a differential file (i.e., a differential program) to be combined with a program which has already been stored in the computer system may be provided for realizing the above functions.

What is claimed is:

1. A system for detecting approach to an object based on time-series images of a surrounding environment, comprising:

an optical flow calculating section for calculating an optical flow based on at least two time-series images;

a first adding section for calculating an added value for detecting approach, by adding values corresponding to data of the optical flow assigned to a first predetermined area defined on the images, where a predetermined filter function is used in the adding calculation;

a second adding section for calculating an added value for detecting vibration, by adding values corresponding to data of the optical flow assigned to a second predetermined area defined on the images, where said filter function is used in the adding calculation; and, a situation determining section for determining that approach to the object has occurred when a difference between the added values for detecting approach and vibration exceeds a predetermined threshold value.

2. A system for detecting approach to an object as claimed in claim 1, wherein:

the second predetermined area is defined in a manner such that the second predetermined area does not include a source of the optical flow on the images; and the first predetermined area is defined further from the source of the optical flow in comparison with the second predetermined area.

3. A system for detecting approach to an object as claimed in any one of claims 1 and 2, wherein the first and second predetermined areas are defined so as to calculate the added values for detecting approach and vibration by using at least one of a yaw component and a pitch component of the optical flow.

4. A system for detecting approach to an object as claimed in claim 1, wherein the situation determining section includes:

a noise removing section for removing a high-frequency noise component from each of the added values for detecting approach and vibration by using a temporal filter based on a predetermined time constant;

a weighting section for multiplying each of the added values for detecting approach and vibration, which include no high-frequency noise component, by a predetermined weight coefficient;

a subtracting section for calculating a difference between the weighted added value for detecting approach and the weighted added value for detecting vibration; and a determining section for determining whether the difference between the weighted added values for detecting approach and vibration exceeds a predetermined threshold value.

5. A system for detecting approach to an object as claimed in claim 1, wherein:

the second predetermined area is defined in a manner such that the second predetermined area does not include a source of the optical flow on the images;

the first predetermined area is defined further from the source of the optical flow in comparison with the second predetermined area;

the first and second predetermined areas are defined so as to calculate the added values for detecting approach and vibration by using at least one of a yaw component and a pitch component of the optical flow; and the situation determining section includes:

a noise removing section for removing a high-frequency noise component from each of the added values for detecting approach and vibration by using a temporal filter based on a predetermined time constant;

a weighting section for multiplying each of the added values for detecting approach and vibration, which include no high-frequency noise component, by a predetermined weight coefficient;

a subtracting section for calculating a difference between the weighted added value for detecting approach and the weighted added value for detecting vibration; and a determining section for determining whether the difference between the weighted added values for detecting approach and vibration exceeds a predetermined threshold value.

6. A method of detecting approach to an object based on time-series images of a surrounding environment, comprising:

an optical flow calculating step for calculating an optical flow based on at least two time-series images;

a first adding step for calculating an added value for detecting approach, by adding values corresponding to data of the optical flow assigned to a first predetermined area defined on the images, where a predetermined filter function is used in the adding calculation;

a second adding step for calculating an added value for detecting vibration, by adding values corresponding to data of the optical flow assigned to a second predetermined area defined on the images, where said filter function is used in the adding calculation; and, a situation determining step for determining that approach to the object has occurred when a difference between the added values for detecting approach and vibration exceeds a predetermined threshold value.

7. A method of detecting approach to an object as claimed in claim 6, wherein:

the second predetermined area is defined in a manner such that the second predetermined area does not include a source of the optical flow on the images; and the first predetermined area is defined further from the source of the optical flow in comparison with the second predetermined area.

8. A method of detecting approach to an object as claimed in any one of claims 6 and 7, wherein the first and second predetermined areas are defined so as to calculate the added values for detecting approach and vibration by using at least one of a yaw component and a pitch component of the optical flow.

9. A method of detecting approach to an object as claimed in claim 6, wherein the situation determining step includes:

a noise removing step for removing a high-frequency noise component from each of the added values for detecting approach and vibration by using a temporal filter based on a predetermined time constant;

a weighting step for multiplying each of the added values for detecting approach and vibration, which include no high-frequency noise component, by a predetermined weight coefficient;

a subtracting step for calculating a difference between the weighted added value for detecting approach and the weighted added value for detecting vibration; and a determining step for determining whether the difference between the weighted added values for detecting approach and vibration exceeds a predetermined threshold value.

10. A method of detecting approach to an object as claimed in claim 6, wherein:

the second predetermined area is defined in a manner such that the second predetermined area does not include a source of the optical flow on the images;

the first predetermined area is defined further from the source of the optical flow in comparison with the second predetermined area;

the first and second predetermined areas are defined so as to calculate the added values for detecting approach and vibration by using at least one of a yaw component and a pitch component of the optical flow; and the situation determining step includes:

a noise removing step for removing a high-frequency noise component from each of the added values for detecting approach and vibration by using a temporal filter based on a predetermined time constant;

a weighting step for multiplying each of the added values for detecting approach and vibration, which include no high-frequency noise component, by a predetermined weight coefficient;

a subtracting step for calculating a difference between the weighted added value for detecting approach and the weighted added value for detecting vibration; and a determining step for determining whether the difference between the weighted added values for detecting approach and vibration exceeds a predetermined threshold value.

11. A program for making a computer execute an operation for detecting approach to an object based on time-series images of a surrounding environment, the operation comprising:

an optical flow calculating step for calculating an optical flow based on at least two time-series images;

a first adding step for calculating an added value for detecting approach, by adding values corresponding to data of the optical flow assigned to a first predetermined area defined on the images, where a predetermined filter function is used in the adding calculation;

a second adding step for calculating an added value for detecting vibration, by adding values corresponding to data of the optical flow assigned to a second predetermined area defined on the images, where said filter function is used in the adding calculation; and, a situation determining step for determining that approach to the object has occurred when a difference between the added values for detecting approach and vibration exceeds a predetermined threshold value.

12. A program as claimed in claim 11, wherein in the operation:

the second predetermined area is defined in a manner such that the second predetermined area does not include a source of the optical flow on the images; and the first predetermined area is defined further from the source of the optical flow in comparison with the second predetermined area.

13. A program as claimed in any one of claims 11 and 12, wherein in the operation, the first and second predetermined areas are defined so as to calculate the added values for detecting approach and vibration by using at least one of a yaw component and a pitch component of the optical flow.

14. A program as claimed in claim 11, wherein in the operation, the situation determining step includes:

a noise removing step for removing a high-frequency noise component from each of the added values for detecting approach and vibration by using a temporal filter based on a predetermined time constant;

a weighting step for multiplying each of the added values for detecting approach and vibration, which include no high-frequency noise component, by a predetermined weight coefficient;

a subtracting step for calculating a difference between the weighted added value for detecting approach and the weighted added value for detecting vibration; and a determining step for determining whether the difference between the weighted added values for detecting approach and vibration exceeds a predetermined threshold value.

15. A program as claimed in claim 11, wherein in the operation:

the second predetermined area is defined in a manner such that the second predetermined area does not include a source of the optical flow on the images;

the first predetermined area is defined further from the source of the optical flow in comparison with the second predetermined area;

the first and second predetermined areas are defined so as to calculate the added values for detecting approach and vibration by using at least one of a yaw component and a pitch component of the optical flow; and the situation determining step includes:

a noise removing step for removing a high-frequency noise component from each of the added values for detecting approach and vibration by using a temporal filter based on a predetermined time constant;

a weighting step for multiplying each of the added values for detecting approach and vibration, which include no high-frequency noise component, by a predetermined weight coefficient;

a subtracting step for calculating a difference between the weighted added value for detecting approach and the weighted added value for detecting vibration; and a determining step for determining whether the difference between the weighted added values for detecting approach and vibration exceeds a predetermined threshold value.

\* \* \* \* \*